US005159329A

United States Patent [19]

Lindmayer et al.

[11] Patent Number: 5,159,329

[45] Date of Patent: Oct. 27, 1992

[54] METHOD FOR SAFEGUARDING CODE WORDS OF A REMOTE CONTROL SYSTEM

[75] Inventors: Martin Lindmayer, Böblingen; Klaus Claar, Sindelfingen, both of Fed. Rep. of Germany

[73] Assignee: Daimler-Benz AG, Fed. Rep. of Germany

[21] Appl. No.: 800,755

[22] Filed: Dec. 2, 1991

Related U.S. Application Data

[63] Continuation of Ser. No. 483,812, Feb. 23, 1990, abandoned.

[30] Foreign Application Priority Data

Feb. 24, 1989 [DE] Fed. Rep. of Germany ....... 3905651

[51] Int. Cl.[5] ........................................... H04B 10/00

[52] U.S. Cl. .......................... 340/825.72; 340/825.31; 307/10.1

[58] Field of Search ........... 340/825.3, 825.31, 825.34, 340/426; 307/9.1, 10.1, 10.2, 10.4, 10.5; 70/264, 256, 257, 271; 180/287

[56] References Cited

U.S. PATENT DOCUMENTS

| | | | |
|---|---|---|---|
| 4,509,093 | 4/1985 | Stellberger | 340/825.31 |
| 4,535,333 | 8/1985 | Twardowski | 340/825.31 |
| 4,596,985 | 6/1986 | Bongard et al. | 340/825.31 |
| 4,646,080 | 2/1987 | Genest et al. | 340/825.31 |
| 4,686,529 | 8/1987 | Kleefeldt | 340/825.31 |
| 4,723,121 | 2/1988 | vanden Boom et al. | 307/10.2 |
| 4,870,400 | 9/1989 | Downs et al. | 340/825.31 |
| 4,888,575 | 12/1989 | De Vaulx | 340/426 |

FOREIGN PATENT DOCUMENTS

| | | |
|---|---|---|
| 0244332 | 4/1986 | European Pat. Off. . |
| 3313609 | 10/1983 | Fed. Rep. of Germany . |
| 3309802 | 7/1985 | Fed. Rep. of Germany . |
| 3244049 | 6/1986 | Fed. Rep. of Germany . |
| 3636822 | 10/1987 | Fed. Rep. of Germany . |
| 2051442 | 1/1981 | United Kingdom . |
| 2184774 | 7/1987 | United Kingdom . |

*Primary Examiner*—Donald J. Yusko
*Assistant Examiner*—Dervis Magistre
*Attorney, Agent, or Firm*—Evenson, Wands, Edwards, Lenahan & McKeown

[57] ABSTRACT

A remote control system having of one or more independent transmitters transmitting code words to a receiver, wherein the code word includes an unalterable code portion, transmitted upon each code transmission together with a code portion which is variable in accordance with a predetermined algorithm, being stored in object-specific fashion both in each transmitter and in the receiver fixed to the object. A synchronizing procedure between a transmitter and the receiver, which can in any case only be carried out in dependence on a mechanical key restriction, is only possible if the individual object-specific code portion of the respective transmitter has been stored and is retrievable in the receiver.

13 Claims, 1 Drawing Sheet

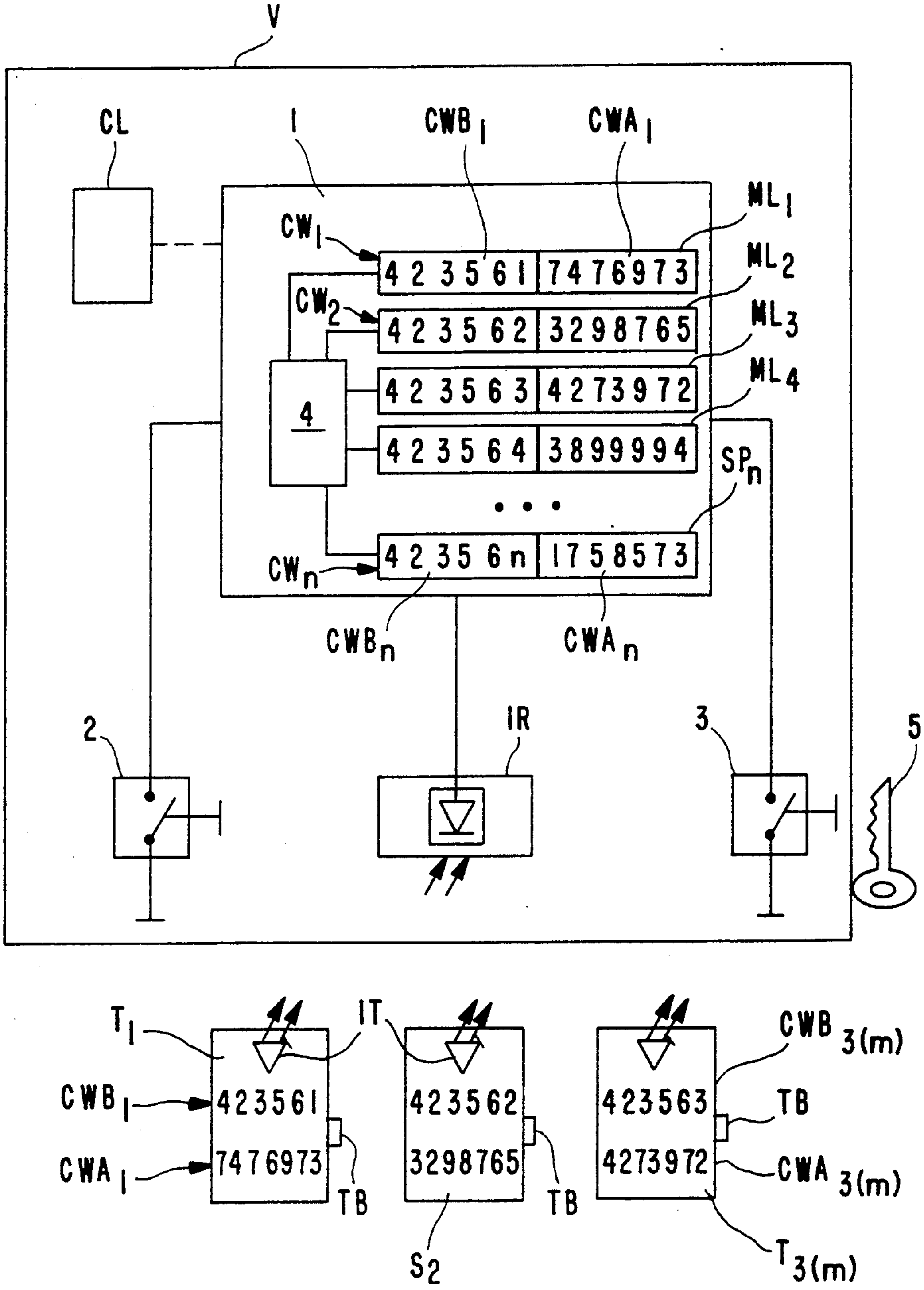
V
CL
1
CWB1
CWA1
ML1
CW1
423561
7476973
ML2
CW2
423562
3298765
ML3
4
423563
4273972
ML4
423564
3899994
SPn
CWn
4235 6n
1758573
CWBn
CWAn
2
IR
3
5
T1
IT
CWB1
423561
CWA1
7476973
TB
423562
3298765
TB
S2
CWB 3(m)
423563
TB
4273972
CWA 3(m)
T3(m)

METHOD FOR SAFEGUARDING CODE WORDS OF A REMOTE CONTROL SYSTEM

This is a continuation of application Ser. No. 07/483,812, filed Feb. 23, 1990, now abandoned.

BACKGROUND AND SUMMARY OF THE INVENTION

The invention relates to a method and system for safeguarding code words of a remotely actuated control system. An example of the mode of operation of a known remote control system, provided in particular for central locking systems of motor vehicles, is shown in German Patent 36 36 822 C1.

The code words of this remote control system are transmitted wirelessly by a remote transmitter and received by a receiver at the control system. The code words are protected against unauthorized recording and use by sychronizing the advancement of a portion, of each code word in the receiver and in the last-used transmitter. The algorithm, which produces the advancement, takes as its basis a normally unalterable key word stored in EEPROMs both in the receiver and in the transmitter.

Owing to the selected composition of each code word and of the algorithm used, which advances in one direction only, a code word which has been used can only recur identically after a very long period of time or a very large number of advances. The unauthorized reuse of an illegally recorded code word is thereby virtually excluded.

In addition to its algorithmically alterable portion, each code word of the generic remote control system can furthermore contain so-called system bits, which can be used for various distinctions—e.g. key types (main/secondary key), car make, key system, currently controllable function etc. According to one variant of the known system, these system bits are exempted from algorithmic alteration. One or more system bit (s) can however nevertheless be altered at will by the user of the transmitter—by switches provided in addition to the transmit button on the transmitter—in order to alter the function controllable or triggerable by the transmitter without influencing the advance algorithm.

While the door of the vehicle is open, the receiver can be switched manually to a "learning phase" by an electrical switch. In this learning phase, the key code word of the receiver is reprogramed, by the next code word transmitted to the receiver from an arbitrary transmitter compatible with the system in general. The system bits may also be reprogramed in the learning phase. This new key code word is then accepted and stored as the key code word underlying the advance in accordance with the predetermined algorithm upon each successive code-word transmission.

A code word stored in an available transmitter can be completely reset by removing the battery from the transmitter. The above-described 'learning phase' of the receiver—using the transmitter with reset code—can then be carried out again. This is recommended in particular for shortening synchronization when the code words in transmitter and receiver have been advanced to a different extent. Of course, an unauthorized person can also carry out the resetting procedure described in the transmitter by temporary removal of the battery from the transmitter in his possession.

A remote control system of a central locking system shown in one embodiment of German Patent DE 32 44 049 C2, makes available, using a plurality of transmitters, a quantity of code words which differs from transmitter to transmitter.

Since the code words of this remote control system are also advanced algorithmically, measures must be taken, in dependence on the transmitter used, to limit the code advance to the limited code-word supply allocated individually to said transmitter. This avoids unnecessary resynchronization effort in the case of alternating transmitter use.

For this purpose, each transmitter is allocated different identification codes, which can be emitted first when the respective transmitter is actuated. For processing the code words which differs from transmitter, a decoding device connected downstream of the receiver is equipped with a plurality of decoding channels corresponding to the number of transmitters. Thus it is possible for said decoding channels to be switched on by the transmitter identification codes.

Nothing is mentioned of the nature of these transmitter identification codes in the last-mentioned patent. Functionally, they are to be equated with the arbitrarily alterable system bits of the generic remote control system and can be used, for identifying key types having different locking functions.

It is shown in German Patent DE 33 09 802 C2 to simplify th adaptation of standardized sensors (for tank filling, temperatures etc.) to the individual conditions in a particular motor vehicle with the aid of a ROM which contains vehicle-specific signal-conversion characteristics and impresses these on the signal-conversion arrangements provided between the sensors and their display instruments. But there is no indication that this can be used for the code words of a remote control system.

According to the invention, all code words generatable by the algorithmic advance includes at least one object-specific and unalterable basic portion of all code words. Since virtually any number of variations of a code-word portion can be produced with relatively little effort by electronic coding, it is possible to allocate to each object, i.e. even to each motor vehicle of a model series, its own, nowhere repeated, object-specific code.

Each transmitter belonging to the object is also allocated an unalterable basic portion of all code words.

This basic portion can be the same for all transmitters and then need be stored only once in the object.

In a preferred embodiment, each transmitter of the remote control system is allocated an individual, unalterable basic portion of all code words. This is consequently object—and transmitter-specific. In this embodiment, a total supply of all individual basic portions which corresponds at least to the number of transmitters supplied for independent parallel use must be stored in the object or receiver.

The permanent storage of the object-specific portions must be withdrawn from any write access storage, i.e. can, for example, be present in ROMs. It can be linked with the temporary storage of the alterable portions or, alternatively, be present in completely, i.e. even physically, separated memories. This has the advantage that, in contrast to the prior art, it is no longer possible to use any transmitter obtainable from a spare-parts dealer for storing a new current code word in the receiver, even when a transmitter RESET has been carried out and the mechanical safeguard has been overcome. This is because, although the object-specific, unalterable portions of the code words are still transmitted and prechecked for correspondence, they can under no circumstances effect alterations of the corresponding permanent memory contents in the object or receiver. It is obvious that the sale of replacement transmitters for such a system can be considerably better monitored and misuse made even more difficult. Exchange of the object-specific basic portions, once allocated, is only possible by exchanging the control device or the memories.

The basic portions can additionally contain user-specific portions which, upon transmitter actuation, impart certain user data to the receiver or object in advance. User-specific code portions of this kind are already known per se; in the automotive application of a remote control system. They act, for example, on adjustable vehicle components such as seats or rear-view mirrors.

Unauthorized use of the remote control system with a lost transmitter can be c very effectively by automatically invalidating—i.e. blocking or erasing each basic code-word portion which is allocated to a transmitter which has a) already been used at least once and b) has not been used in a read-in procedure. This automatic safeguarding function can be made dependent on various conditions:

the at least single use of the transmitter, the basic code-word portion of which is to be blocked, can be detected, for example, by recording a code advance procedure in the associated alterable portion of said code word;

the safeguarding function can in principle be carried out during the final acknowledgement of a read-in procedure performed with a plurality of transmitters; or it can be carried out in dependence on the sequence of reading in, e.g. if, during the read-in procedure, a particular sequence is not complied with because one transmitter is missing. Here it is useful if the total supply of basic code-word portions stored in the object is somewhat larger than the number of transmitters supplied. An additional basic code-word portion, which has not yet been used, from the total supply can then be allocated to the transmitters to be newly acquired for the remote control system.

Other objects, advantages and novel features of the present invention will become apparent from the following detailed description of the invention when considered in conjunction with the accompanying drawings.

BRIEF DESCRIPTION OF THE DRAWINGS

The single drawing figure shows a remote control system having a single object and a plurality of transmitters constructed in accordance with an embodiment of the present invention.

DETAILED DESCRIPTION OF THE DRAWINGS

A total quantity of n code words $CW_l$ to $CW_n$ is stored in n memory locations $ML_l$ to $ML_n$ in a control device 1 arranged in an object to be protected, e.g. a motor vehicle V. It corresponds to at least a number m of associated transmitters $T_l$ to $T_m$ which are to be supplied for independent use in parallel, e.g. by different persons. The number m of transmitters $T_l$ to $T_m$ can be less than or equal to n. In the illustration chosen, m=3.

Each code word $CW_l$ to $CW_n$ consists of a) a fixed basic portion $CWB_1$, $CWB_2$ etc., which is object- and transmitter-specific and cannot be altered, i.e. is stored, for example, in ROMs, and b) an alterable portion $CWA_1$, $CWA_2$ etc., which is alterable in known manner in accordance with any desired algorithm in both the transmitters and the receiver control device.

The specific algorithm is not essential to the invention and is therefore not explained in greater detail here. Algorithms and apparatus to produce them are discussed in the Background of the Invention. For the sake of clarity, the memory locations $ML_{l \dots m}$ for the unalterable basic portions and the alterable portions are illustrated as unitary but can of course have different structures, in particular can also be physically separated from one another.

The code words $CW_{l \dots m}$ are here illustrated graphically as sequences of decimal numbers. It is self-evident that the type of code used and, likewise, the manner of transmission of the code words between the transmitters and the receiver are completely irrelevant to the essential nature of the invention. Any desired types of code or transmission methods can be used (infrared, ultrasound, radio). As can be seen, the alterable portions CWA of the code words also differ from one another; since they are independently advanced by the control device 1 after each code transmission. Identical alterable portions $CWA_{l \dots n}$ in two or more code words can only occur by chance, if at all; but code words then still differ in their basic unalterable portions CWB . . . .

Each transmitter $T_1$ to $T_3$ contains, a code transmission element, illustrated as an infrared diode IT, which can be activated to transmit the current code word CW . . . . stored in the particular transmitter by actuation of a transmit button TB. As can be seen, the current code words $CW_1$ to $CW_3$ of transmitters $T_1$ to $T_3$ correspond completely to those in memory locations $ML_1$ to $ML_3$ of the control device 1. The code word in a specific transmitter is advanced by an algorithm after each transmission.

An infrared receiver IR of the motor vehicle V passes each code word $CW_{1 \dots 3}$ received on in known manner to the control device. Before the execution of any function controllable by transmitter T, i.e., for example, unlocking or locking of the vehicle by a symbolically indicated central locking system CL connected to control device 1, the receiver code word CW is compared to the code words $CW_{1 \dots 3}$ stored in the memory locations $ML_{1 \dots 3}$ for complete correspondence.

If complete correspondence is ascertained, then, in the illustrative embodiment, the vehicle V is unlocked centrally in execution of a controlled function—"unlocking". The control device 1 does not of course react to code words of a strange or desynchronized transmitter. It is self-evident that more than just one receiver IR can also be provided; however, a single central control device 1 would to be used.

A reset button 2, likewise associated with the control device 1, is provided in the protected zone of the object, e.g. in the passenger compartment of the motor vehicle V. It is thus accessible only when the object has been desecured (=open door). By this reset button 2, all alterable portions $CWA_{l \dots n}$ of the control device 1 can be reset, independently of transmitter actuation, to defined initial states—which can likewise differ from one another. By this resetting, the owner of the vehicle can, in the event of loss of a transmitter, immediately prevent unauthorized persons from using the lost transmitter for controlling the function allocated to it. The current code words in the transmitters are of course not reset in this procedure.

Starting from this reset state of the alterable portions $CWA_{l \ldots n}$, the memory contents of the control device 1 must be resynchronized with the corresponding memory contents of the transmitters $T_{l \ldots m}$ still in the possession of the vehicle owner in order to ensure that they can continue to be used. For this purpose, a rereading code transmission must be carried out from each of these transmitters to the receiver. Each first code transmission of each transmitter after a resetting procedure is considered a rereading code transmission. During this procedure, the object- and transmitter-specific basic code-word portions $CWB_{l \ldots n}$ are in all cases used:

a) to check the code word read-in to establish whether at least a "matching" basic portion $CWB_{l \ldots n}$ is being transmitted; and b) to unambiguously allocate the alterable portion $CWA_{l \ldots n}$ being re-read in from the transmitter $T_{l \ldots n}$ to the corresponding basic portion $CWB_{l \ldots n}$ stored in the object.

Before the finally effective storage of its alterable portion $CWA_{l \ldots n}$ in a memory location $ML_{l \ldots n}$, each re-read code word must then be acknowledged by a further switch 3 which is associated with the control device 1 and represents an acknowledgement device. The switch 3 can only be actuated if a mechanical key 5 which fits is available. This key 5 here symbolically represents the associated mechanically coded device for actuating the switch 3. This can, for example, be integrated—in a known manner—into a lock cylinder (not shown) of a door or of an ignition/steering lock and be actuated therein directly by the key 5. The additional mechanical safeguarding of each read-in procedure results in the advantage that unauthorized resynchronization of the control device 1 or of the receiver using the lost transmitter can be prevented merely by replacing the mechanical locks of the motor vehicle V.

An invalidation device 4 is provided—which can, for example, switch on a read lockout for one or more memory locations $ML_{l \ldots m}$ or control an erasure of the particular memory content. Thus it is possible to invalidate the unalterable basic portions $CWB_{l \ldots n}$ or the complete code words $CW_{l \ldots n}$ which were allocated to the lost transmitters. The invalidation device 4 is, for example, activated by locking actuation of the switch 3.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a remote control system including:

at least one moveable transmitter for transmitting code words, said transmitter having means for storing at least one code word;

an object having a receiver for receiving said code words;

a controller coupled to the receiver in the object for controlling functions of devices connected downstream of the receiver, in particular locking functions of a motor vehicle central locking system;

each code word consists of an alterable portion altered in accordance with a predetermined algorithm by at least one of the transmitter or object and of a basic portion not subject to this algorithm and that is not repeated such that no two basic portions are identical;

means in the object for testing complete correspondence of a received code word with the corresponding portions of at least one code word stored in the object, before any function is executed by said controller;

the improvement comprising:

a plurality of n memory locations in the object for the unalterable storage of a total quantity of object- and transmitter-specific, mutually differing basic portions allocated individually to said object; and a plurality of m transmitters, where m is less than n, each transmitter storing in said means for storing a different one of the basic portions located in one of said n memory locations;

reset means in a protected zone in said object for resetting only the alterable portions of all code words stored in the memory locations of the object to initial states;

checking means for checking in said object the basic portion of each code word transmitted by a transmitter to the receiver;

acknowledgement means, actuable by a mechanically coded device for controlling the control, for acknowledging a code word reading-in effected by a transmitter after resetting of the alterable portions of all code words by said reset means.

2. Remote control system according to claim 1, including:

algorithm means in said transmitters and said receiver for the synchronous advancement of the alterable portion of stored current code word, in a transmitting transmitter and a corresponding code word in said receiver in accordance with the predetermined algorithm after each code transmission from the transmitter; and blocking means in said for blocking the remote control system at least against code words already transmitted in the recent past by the respective transmitter.

3. Remote control system according to claim 1, wherein user-specific portions of the basic code-word portion are allocated to each transmitter.

4. Remote control system according to claim 1, wherein the object-specific basic portions are stored in ROMs.

5. Remote control system according to claim 1, including physically separated memories for the respective storage of the object-specific basic portions and of the alterable portions.

6. Remote control system according to claim 1, wherein the number of transmitters m is smaller than the number n of code words stored in the object.

7. In a method for safeguarding code words of a remote control system which can be transmitted for the purpose of controlling functions, in particular for a motor vehicle central locking system in which:

a) each code word to be transmitted from a transmitter to a receiver consists of an alterable portion that is altered by the transmitter and the receiver in accordance with a predetermined algorithm and of a basic portion not subject to this algorithm, and b) both of these portions are always transmitted together and before execution of any controlling function are checked with corresponding portions of at least one code word stored in the object for complete correspondence, the improvement comprising:

allocating at least one corresponding unalterable, object-specific basic portion of each code word both to the object and to each transmitter where the basic portion is not repeated such that no two basic portions are identical, wherein the alterable portion of each code word stored in the object can be reset in the object to defined initial states by means physically separate from the transmitter; and automatically resetting the alterable portion of at least one code word stored in the object to a defined initial state;

wherein the basic code-word portion allocated to a transmitter and not subject to the algorithm can be invalidated in the object;

including automatic invalidating of the basic code-word portion allocated to one of the transmitters already used once with advancement of the alterable code-word portion, if this transmitter is not used for reading-in; and wherein the alterable portion of each code word is altered only after each code word transmission by the transmitter.

8. Method according to claim 7 including:

allocating to the object a total quantity of unalterable basic code-word portions, each object and transmitter-specific, which corresponds at least to a predetermined number of transmitters separately usable in the remote control system; and allocating one unalterable basic portion from this total quantity to each of the transmitters.

9. Method according to claim 8, wherein said alterable portion of each code word is independently algorithmically altered.

10. Method according to claim 18 wherein at least the alterable portion of the code word, of which there is at least one stored in the object, can be re-read from a transmitter to the object; and including checking the basic portion of the code word transmitted by the transmitter during reading-in for complete correspondence with a basic code-word portion stored in the object before reading-in of the alterable code-word portion.

11. Method according to claim 7, wherein at least the alterable portion of the code word, of which there is at least one stored in the object, can be reread from a transmitter to the object; and including checking the basic portion of the code word transmitted by the transmitter during reading-in for complete correspondence with a basic code-word portion stored in the object before reading-in of the alterable code-word portion.

12. Method according to claim 11, wherein the basic code-word portion allocated to a transmitter and not subject to the algorithm can be invalidated in the object; and including automatic invalidating of the basic code-word portion allocated to one of the transmitters already used once with advancement of the alterable code-word portion, if this transmitter is not used for rereading.

13. In a remote control system including:

at least one moveable transmitter for transmitting code words, said transmitter having means for storing at least one code word;

an object having a receiver for receiving said code words;

a controller coupled to the receiver in the object for controlling functions of devices connected downstream of the receiver, in particular locking functions of a motor vehicle central locking system;

each code word consists of an alterable portion altered in accordance with a predetermined algorithm by at least one of the transmitter or object and of a basic portion not subject to this algorithm and that is not repeated such that no two basic portions are identical;

means in the object for testing complete correspondence of a received code word with the corresponding portions of at least one code word stored in the object, before any function is executed by said controller;

the improvement comprising:

a plurality of n memory locations in the object for the unalterable storage of a total quantity of object- and transmitter-specific, mutually differing basic portions allocated individually to said object; and a plurality of m transmitters, where m is not greater than n, each transmitter storing in said means for storing a different one of the basic portions located in one of said n memory locations;

reset means in said object for resetting only the alterable portions of all code words stored in the memory locations of the object to initial states;

checking means for checking in said object the basic portion of each code word transmitted by a transmitter to the receiver;

acknowledgement means, actuable by a mechanically coded device for controlling the control, for acknowledging a code word reading-in effected by a transmitter after resetting of the alterable portions of all code words by said reset means;

including an invalidation means for invalidating at least the basic code-word portions stored in the memory locations of the object to prevent reading-in for an invalidated transmitter.

* * * * *